US007249218B2

(12) United States Patent
Gibble et al.

(10) Patent No.: US 7,249,218 B2
(45) Date of Patent: Jul. 24, 2007

(54) METHOD, SYSTEM, AND PROGRAM FOR MANAGING AN OUT OF AVAILABLE SPACE CONDITION

(75) Inventors: Kevin Lee Gibble, Tucson, AZ (US); Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 623 days.

(21) Appl. No.: 10/230,789

(22) Filed: Aug. 29, 2002

(65) Prior Publication Data

US 2004/0044853 A1    Mar. 4, 2004

(51) Int. Cl.
G06F 12/00    (2006.01)

(52) U.S. Cl. .................. 711/113; 707/200; 711/111; 711/112

(58) Field of Classification Search ............... 711/112, 711/161, 162, 163, 147, 156, 165, 113; 707/204, 707/205
See application file for complete search history.

(56) References Cited

U.S. PATENT DOCUMENTS

| | | | |
|---|---|---|---|
| 4,530,055 A | 7/1985 | Hamstra et al. | |
| 5,043,885 A | 8/1991 | Robinson | |
| 5,164,909 A | 11/1992 | Leonhardt et al. | |
| 5,253,351 A | 10/1993 | Yamamoto et al. | |
| 5,390,318 A | 2/1995 | Ramakrishnan et al. | |
| 5,412,780 A | 5/1995 | Rushton | |
| 5,546,557 A | 8/1996 | Allen et al. | |
| 5,636,355 A | 6/1997 | Ramakrishnan et al. | |
| 5,790,828 A | 8/1998 | Jost | |
| 5,829,023 A | 10/1998 | Bishop | |
| 5,926,834 A | 7/1999 | Carlson et al. | |
| 5,956,301 A | 9/1999 | Dimitri et al. | |
| 6,038,490 A | 3/2000 | Dimitri et al. | |
| 6,067,599 A | 5/2000 | Kishi et al. | |
| 6,163,773 A | 12/2000 | Kishi | |
| 6,304,880 B1 | 10/2001 | Kishi | |
| 6,336,163 B1 | 1/2002 | Brewer et al. | |
| 6,339,778 B1 | 1/2002 | Kishi | |
| 6,351,685 B1 | 2/2002 | Dimitri et al. | |
| 6,636,778 B2 * | 10/2003 | Basham et al. ............. 700/214 |
| 6,725,241 B1 * | 4/2004 | Rodriguez et al. ......... 707/203 |

OTHER PUBLICATIONS

U.S. Appl. No. 10/230,612, filed Aug. 29, 2002, entitled "Method, System, and Program for Transferring Data", by inventors K.L. Gibble et al.

(Continued)

Primary Examiner—Brian R. Peugh
Assistant Examiner—Matthew Bradley
(74) Attorney, Agent, or Firm—Janaki K. Davda; Konrad Raynes & Victor LLP

(57) ABSTRACT

Disclosed is a system, method, and program for managing an out of available space condition. A mount command for a logical volume is received that identifies one or more physical volume pools to be subsequently used for pre-migration. It is determined that one or more of the physical volume pools have no physical volumes available for storing data. Data is prevented from being written to cache by deferring completion of the mount command until the determined one or more physical volume pools has one or more physical volumes available for storing data.

48 Claims, 11 Drawing Sheets

OTHER PUBLICATIONS

U.S. Appl. No. 10/230,936, filed Aug. 29, 2002, entitled "Method, System, and Program for Managing Storage Units in Storage Pools" by inventors W.C. Carlson et al.

U.S. Appl. No. 10/230,639, filed Aug. 29, 2002, entitled "Method, System, and Article of Manufacture for Managing Storage Pools" by inventors G.T. Kishi et al.

U.S. Appl. No. 10/230,522, filed Aug. 29, 2002, entitled "Method, System, and Article of Manufacture for Returning Physical Volumes" by inventors G.T. Kishi et al.

U.S. Appl. No. 10/231,816, filed Aug. 29, 2002, entitled "Method, System, and Article of Manufacture for Borrowing Physical Volumes" by inventors G.T. Kishi et al.

U.S. Appl. No. 10/231,815, filed Aug. 29, 2002, entitled "Method, System, and Program for Moving Data Among Storage Units" by inventors G.T. Kishi et al.

M. Werner, et al., "Magstar Peer-To-Peer Virtual Tape Server Planning and Implementation Guide", IBM Corp., Dec. 2000, Document No. SG24-6115-00, Chapters 1 and 2.

IBM Corp., "Logical Grouping of Data Storage Media in a Library System", Technical Disclosure Bulletin, vol. 35, No. 5, Oct. 1992, pp. 17-20.

* cited by examiner

500

510   520

| Physical Volume Pool Identifier | Status |
|---|---|
| 1 | Physical volumes do not have available space |
| 2 | Physical volumes have available space |
| 3 | Physical volumes have available |
| N | Physical volumes do not have available space |

FIG. 5

METHOD, SYSTEM, AND PROGRAM FOR MANAGING AN OUT OF AVAILABLE SPACE CONDITION

BACKGROUND OF THE INVENTION

1. Field of the Invention

The present invention is directed to managing an out of available space condition.

2. Description of the Related Art

In prior art virtual tape storage systems, hard disk drive storage emulates tape drives and tape cartridges. For instance, host systems perform input/output (I/O) operations with respect to a tape library by performing I/O operations with respect to a set of hard disk drives that emulate the tape library. In prior art virtual tape storage systems, such as the International Business Machines (IBM) Magstar** Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

**IBM, Tivoli, RS/6000, AIX, and Magstar, OS/390 are trademarks of International Business Machines Corp.

The DASD functions as a cache to volumes in the tape library. In VTS operations, the VTS receives the host's requests to access a volume in the tape library and returns data for such requests, if possible, from the cache. If the volume is not in the cache, then the VTS recalls the volume from the tape library to the cache, i.e., the VTS transfers data from the tape library to the cache. The VTS can respond to host requests for volumes that are present in the cache substantially faster than requests for volumes that have to be recalled from the tape library to the cache.

Since the cache can satisfy requests faster than the tape library, I/O requests can be satisfied faster if frequently accessed volumes are kept in the cache. However, since the capacity of the cache is relatively small when compared to the tape library, not all volumes can be kept in the cache. Hence, the VTS also premigrates volumes from the cache to the tape library, i.e., the VTS transfers data from the cache to the tape cartridges in the tape library. The process of transferring data from the cache to the tape cartridges is referred to as premigration. Eventually, these premigrated volumes will be removed from the cache and shortened to a pointer to the data on tape cartridges, freeing space in the cache for new data. This shortening, or "migration," operation is very fast, and the performance bottleneck in the VTS is the premigration operation.

The tape cartridges in the tape library may be organized as pools of tape cartridges. That is, a pool is a set of tape cartridges. The host identifies the pool to which particular data in DASD is written. When there is no unused space on tape cartridges available in a pool to which data from DASD is to be written, it is possible that data for pools that are do not have unused space on tape cartridges continue to write to DASD. Since there is no unused space on the tape cartridges to transfer data for these pools out of DASD, data for these pools eventually may consume all space in DASD.

Thus, there is a need in the art for improved techniques for managing premigration of data.

SUMMARY OF THE INVENTION

Provided are a method, system, and program for managing an out of available space condition. A mount command for a logical volume is received that identifies one or more physical volume pools to be subsequently used for premigration. It is determined that one or more of the physical volume pools have no physical volumes available for storing data. Data is prevented from being written to cache by deferring completion of the mount command until the determined one or more physical volume pools has one or more physical volumes available for storing data.

In certain implementations, it is determined that data is expected to be written to the logical volume after receiving the mount command.

In additional implementations, it is determined that data is expected to be read from the logical volume after receiving the mount command, and the mount command is allowed to complete.

In certain implementations, a status of each of the physical volume pools is monitored and a physical volume pool table is updated with the status. In certain further implementations, the determination that the one or more physical volume pools have no physical volumes available for storing data is performed by accessing the physical volume pool table.

In additional implementations, when an amount of available space on the physical volumes exceeds a threshold for each of the physical volume pools specified in the mount command, the mount command is processed.

In further implementations, one or more mount commands are evaluated to determine which of the mount commands may be processed.

In yet further implementations, when an amount of available space on the physical volumes exceeds a threshold for each of the physical volume pools specified in the mount command, the data is allowed to be written to the cache.

In certain implementations, deferring completion of the mount command comprises storing the mount command in a queue.

In additional implementations, preventing the data from being written to the cache comprises preventing logical volumes from being mounted.

In yet additional implementations, preventing the data from being written to the cache allows the mount command to complete and fails one or more subsequently received write commands to the logical volume.

In further implementations, preventing the data from being written to the cache allows the mount command to complete and holds one or more subsequently received write commands to the logical volume in a queue.

In yet further implementations, the mount command is transmitted from a host to a library manager through a virtual tape server for processing. In yet further implementations, the library manager notifies the host through the virtual tape server that the mount command has been completed.

The described implementations of the invention provide a method, system, and program for managing an out of available space condition. In particular, logical volumes associated with physical volume pools that do not have physical volumes with available space for storing data may not be written to cache.

BRIEF DESCRIPTION OF THE DRAWINGS

Referring now to the drawings in which like reference numbers represent corresponding parts throughout:

FIG. 5 illustrates, in a block diagram, a physical volume pool table in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
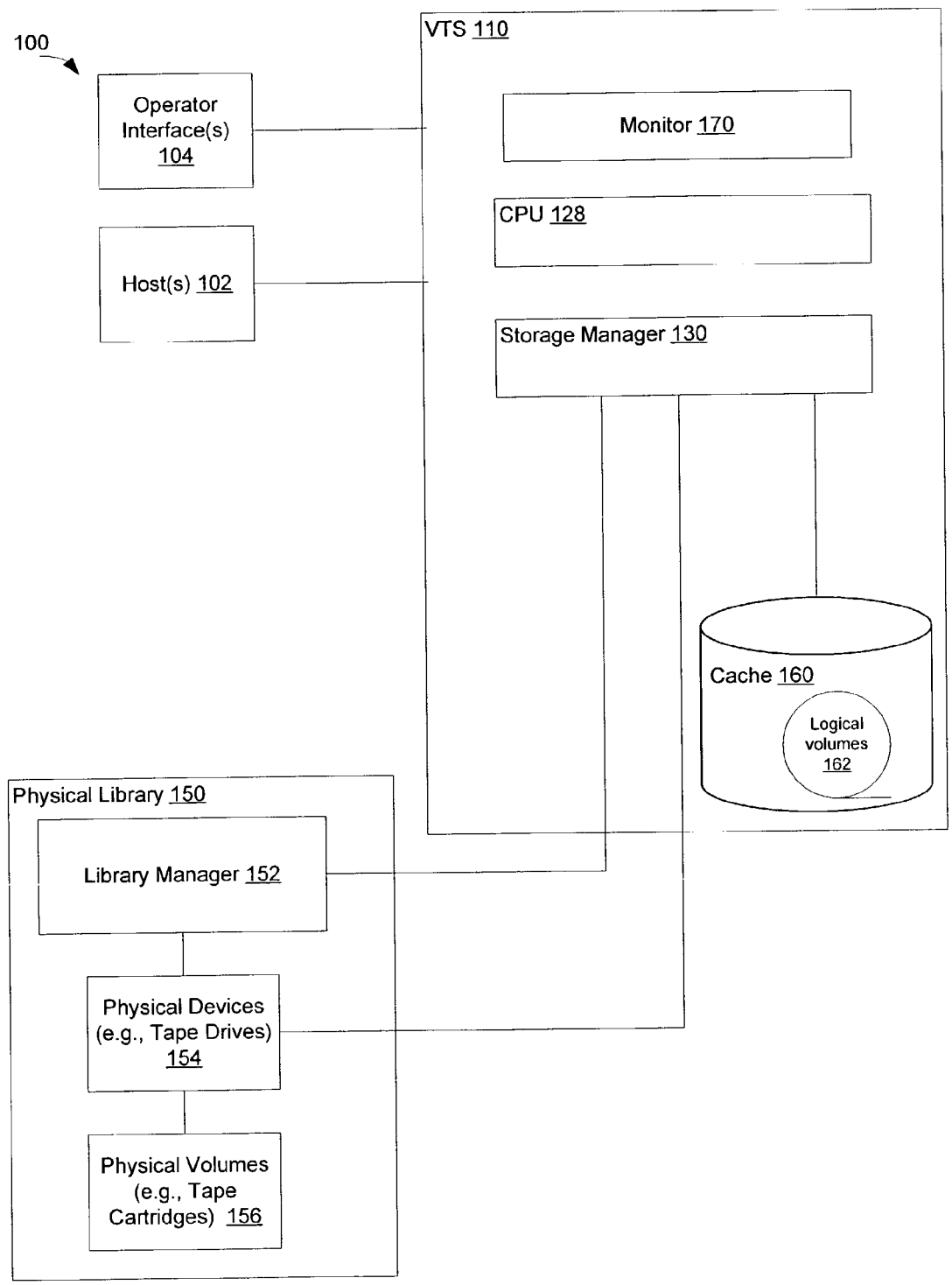
FIG. 1A illustrates, in a block diagram, a computing environment in accordance with some implementations of the invention.

FIG. 1A illustrates, in a block diagram, a computing environment in accordance with some implementations of the invention. A Virtual Tape Server (VTS) 110 emulates virtual tapes as files on a direct access storage device (DASD) cache. Additional VTSs may be deployed, but for purposes of illustration, a single VTS 110 is shown. The VTS 110 is any server computational device known in the art and includes any operating system known in the art. For instance, in certain implementations of the invention, the VTS 110 may be implemented in one or more computers comprising an IBM RS/6000 system and include the IBM AIX operating system.

One or more hosts 102 and one or more operator interfaces connect to the VTS 110. The hosts 102 and operator interfaces 104 may be any computational device known in the art, such as a personal computer, a workstation, a server, a mainframe, a hand held computer, a palm top computer, a telephony device, network appliance, etc. The hosts 102 and operator interfaces 104 may include any operating system known in the art, such as the IBM OS/390** operating system.

The VTS 110 includes at least one central processing unit (CPU) 128 and applications, such as a storage manager 130 that optimizes storage utilization and a monitor 170 that monitors the status of physical volume pools (i.e., physical volumes that are organized into pools). The storage manager 130 and monitor 170 may be implemented either as standalone applications or as part of one or more other applications.

The storage manager 130 controls access to a cache 160, such as a DASD file buffer, and a physical library 150, such as an automated tape library. In certain implementations, the storage manager 130 may include software to utilize a tape library, such as the IBM Magstar Virtual Tape Server, and the IBM ADSTAR Distributed Management (ADSM) software or Tivoli Storage Manager. The storage manager 130 may perform data movement operations between the hosts 102, the cache 160, and the physical library 150. Further details of the VTS technology are described in the IBM publication "Magstar** Peer-to-Peer Virtual Tape Server Planning and Implementation Guide," IBM document no. SG24-6115-00 (Copyright IBM, 2000), which publication is incorporated herein by reference in its entirety.

The physical library 150 may comprise an IBM Magstar Tape Library, such as the Magstar 3494 Tape Library, or any other tape library system known in the art. In certain implementations, the physical library 150 comprises numerous physical devices 154, such as tape drives, CD ROM drives, DVD ROM drives, etc. that provide access to physical volumes 156. The physical volumes 156 may be organized into pools. In certain implementations, the VTS 110 provides the image of up to 256 tape drives 154 (e.g., 3490 tape drives from IBM).

The cache 160 may comprise numerous interconnected hard disk drives. The cache 160 stores logical volumes 162. In certain implementations, the logical volumes 162 are not organized into pools, although the physical volumes 156 are organized into pools. Moreover, the logical volumes 162 may be stored anywhere in cache, and the cache is not partitioned with each partition being associated with a physical volume pool. The cache 160 improves performance by allowing host I/O requests from the hosts 102 to the physical library 150 to be serviced from the faster accessible cache 160 as opposed to the slower accessible physical library 150. The disks in the cache may be arranged as a Direct Access Storage Device (DASD), Just a Bunch of Disks (JBOD), Redundant Array of Inexpensive Disks (RAID), etc.

The hosts 102 exchange tape operations with the VTS 110. The execution of the tape operations retrieves data from or stores data into logical volumes 162 stored in the cache 160. The VTS automatically premigrates (i.e., offloads) logical volumes 162 in cache 160 after they have been accessed by the hosts 102 onto physical volumes 156. In certain implementations, the least recently used (LRU) logical volume 162 is transferred before other logical volumes 162. If one of the hosts 102 requires a logical volume 162 that is not in the cache 160, the storage manager 130 of the VTS 110 commands the tape library 150 to mount the appropriate physical volume 156 into a physical device 154. Then, the required data is copied from the physical volume 156 as a logical volume 162 in the cache 160 (i.e., the data is recalled).

Figure 1B:
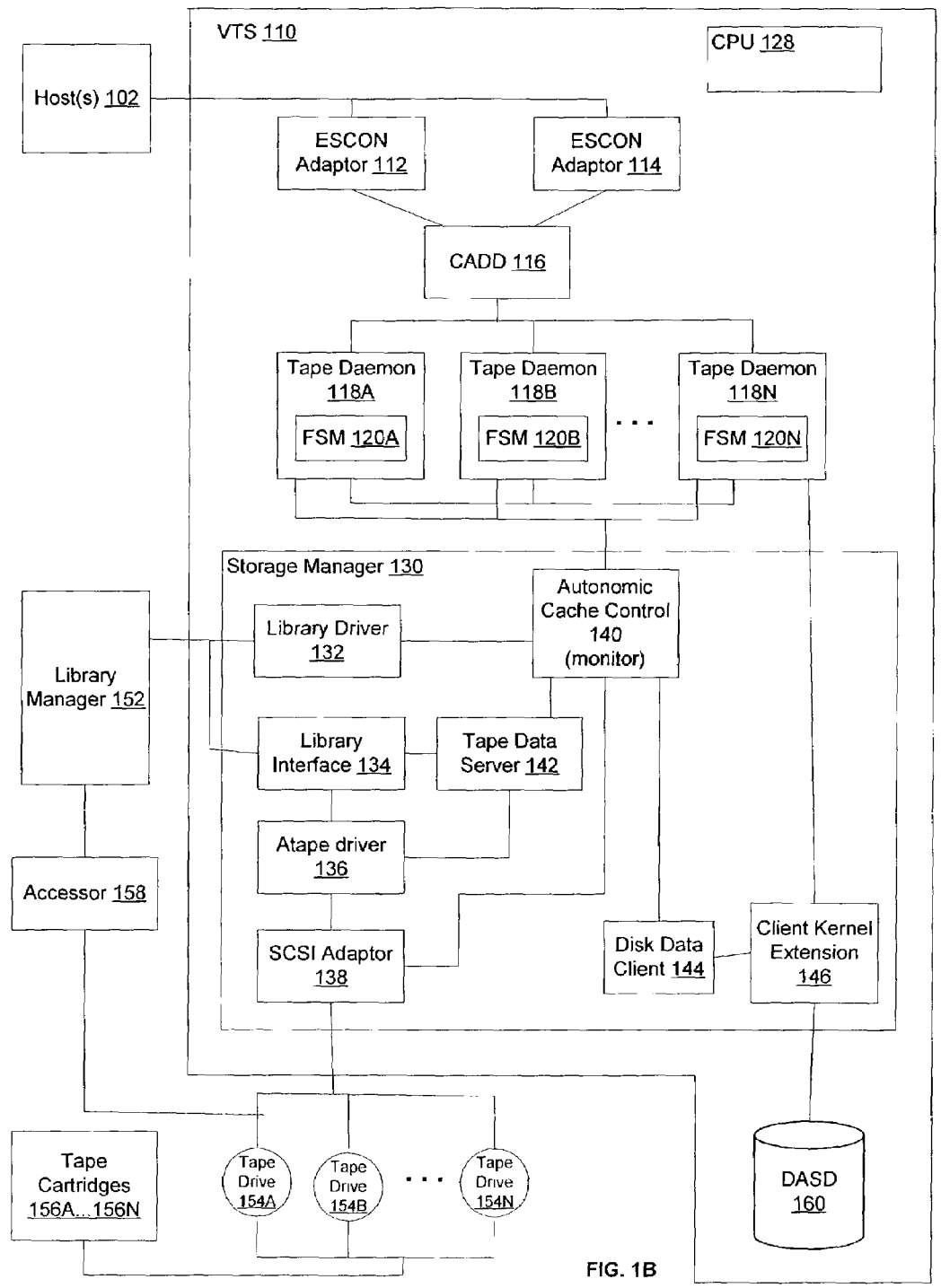
FIG. 1B illustrates, in a block diagram, further details of a computing environment in accordance with implementations of the invention.

FIG. 1B illustrates, in a block diagram, further details of a computing environment in accordance with implementations of the invention. The hosts 102 may connect to the VTS 110 through host data interfaces, such as Enterprise System Connection (ESCON)** adaptors 112 and 114 or any other switching mechanism known in the art (e.g., fibre channel, Storage Area Network (SAN) interconnections, etc.). The CADD 116 is a device driver for tape daemons 118A . . . 118N. Tape daemons 118A . . . 118N receive read and write tape operations from hosts 102. For a write operation, the tape daemons 118A . . . 118N receive data, create logical volumes, and write the logical volumes as files in cache 160. For read operations, the tape daemons 118A . . . 118N access the cache 160 to retrieve data through client kernel extension 146 and return the data to hosts 102. The hosts 102 believe that they are communicating with physical tape drives, rather than with the tape daemons 118A 118N, which emulate the physical tape drives. Each tape daemon 118A . . . 118N includes a file system manager (FSM) 120A . . . 120N that is used to create files in cache 160.

The storage manager 130 transfers data from cache 160 to tape drives 154A . . . 154N. In certain implementations, the storage manager 130 includes multiple components, as illustrated in FIG. 1B. The autonomic cache control 140 controls the transfer of data from cache 160 to tape drives 154A . . . 154N in response to transfer operations received from hosts 102. Additionally, the autonomic cache control 140 controls the rate at which the tape daemons 118A . . . 118N write data to the cache 160. In certain implementations, the autonomic cache control 140 performs the monitoring of monitor 170.

In particular, the autonomic cache control 140 receives notification from one of the hosts 102 to transfer data. The hosts 102 indicate which logical volumes 162 are to be placed into particular pools of tape cartridges 156A . . . 156N. The autonomic cache control 140 maintains metadata on which files are stored in cache 160. The autonomic cache control 140 notifies the disk data client 144 to transfer data. The disk data client 144 requests data from the client kernel extension 146, which retrieves the requested data from cache 160 and forwards the data to disk data client 144. The disk data client 144 forwards the data to tape data server 142 at the request of the autonomic cache control 140.

The tape data server controls the writing of data to tape drives 154A . . . 154N. The data is sent from tape data server to Atape driver 136 to SCSI adaptor 138 and to the tape drives 154A . . . 154N. The tape data server uses a library interface 134 to tell the library manager 152 which tape cartridge 154 is to be put into one of the tape drives. The autonomic cache control 140 sends messages to the library manager 152 through the library driver 132.

The library manager 152 manages the mounting and unmounting of the tape cartridges 156A . . . 154N from the tape drives 154A . . . 154N. When the library manager 152 receives a notification to mount or unmount a tape cartridge 154, the library manager 152 notifies the accessor 158, which is used to access the tape drives 154A . . . 154N. The accessor 158 mounts and unmounts tape drives 154A . . . 154N.

Figure 2:
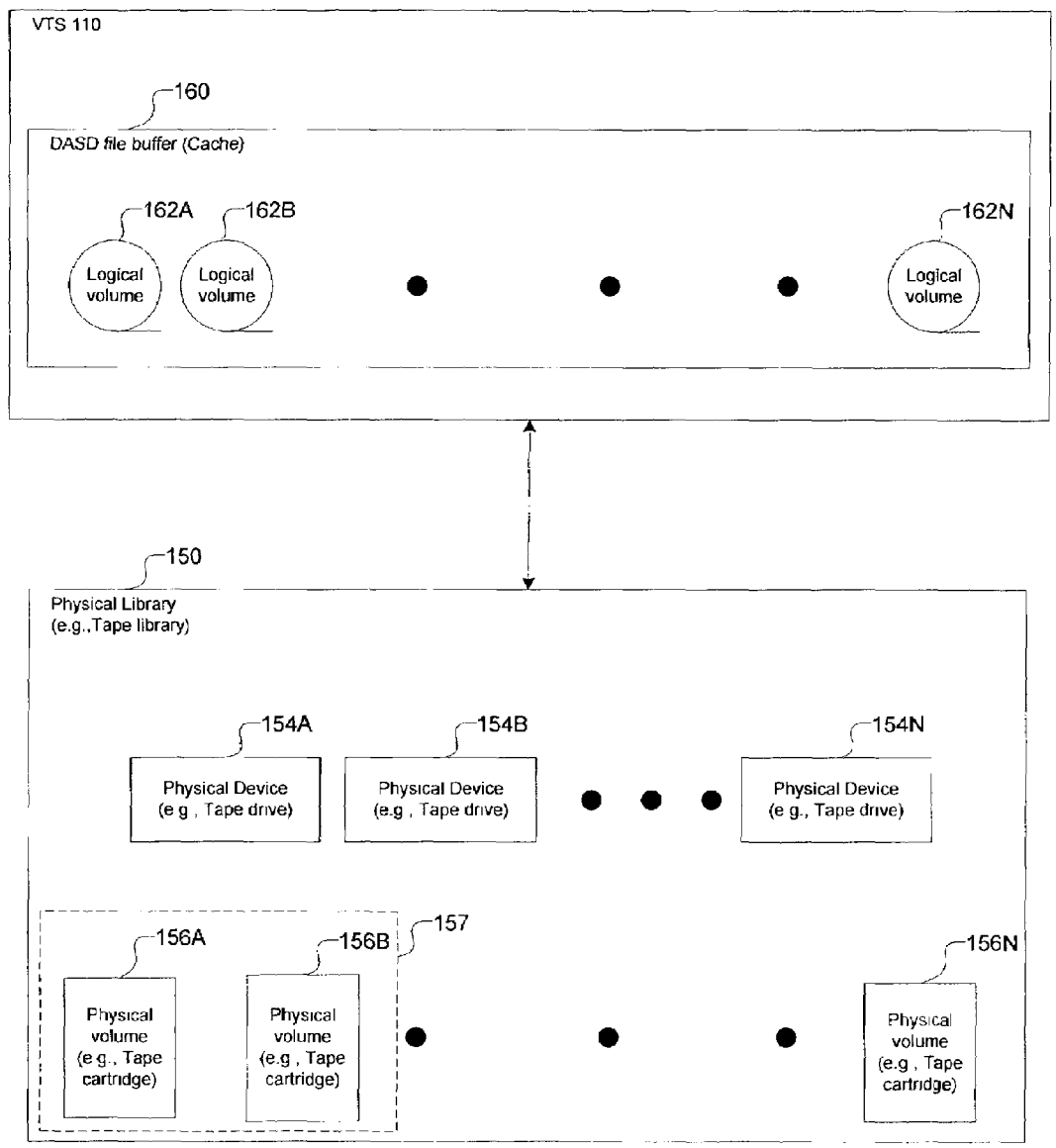
FIG. 2 illustrates, in a block diagram, a virtual tape server, a cache, and a physical library in accordance with certain implementations of the invention.

FIG. 2 illustrates, in a block diagram, the VTS 110, the cache 160 and the physical library 150 in accordance with certain implementations of the invention. The physical library 150, in addition to including the physical devices 154A . . . 154N, includes physical volumes 156A . . . 156N. A physical volume may be mounted on any of the physical devices 154A . . . 154N. In certain implementations the physical volumes are tape cartridges that may be mounted via mechanical mounting onto the physical devices 154A . . . 154N that are tape drives. In alternative implementations the physical volumes may be CD ROMs, DVDs or other storage media. In certain implementations, the number of physical volumes 156A . . . 156N are larger than the number of physical devices 154A . . . 154N. The physical volumes 154A . . . 154N may be organized into pools. For example, physical volumes 156A and 156B may be in pool 157.

The major operations occurring between the cache 160 and the physical devices 154A . . . 154N are premigration (i.e., the transfer of data from the cache 160 to the physical volumes 156A . . . 156N) and recall (i.e., the transfer of data from the physical volumes 156A . . . 156N to the cache 160). In certain implementations the VTS 110 provides an N:1 ratio, where N is typically 10-20, of logical devices to physical devices 154A . . . 154N. In such implementations, since there are more physical volumes 156A . . . 156N (corresponding to the logical volumes stored in the logical devices) than physical devices 154A . . . 154N, there may be time periods when the VTS 110 has more physical volumes to be mounted for recalls than there are physical devices in the VTS 110. As a result, physical volumes may need to be unmounted so that other physical volumes may be mounted.

When a host 102 requests a logical volume from the VTS 110, a cache hit occurs if the logical volume is resident in the cache. If the logical volume is not resident in the cache, the storage manager 130 determines whether the corresponding physical volume 156A . . . 156N is mounted on one of the physical devices 154A . . . 154N. If the corresponding physical volume 156A . . . 156N is not mounted then the storage manager 130 mounts the corresponding physical volume 156A . . . 156N on one of the physical devices 154A . . . 154N. The data for the logical volume is then transferred back, i.e., recalled, from the corresponding physical volume 156A . . . 156N. Recall operations can take several minutes. The recall latency includes the time for a robotic arm to access a tape cartridge and insert the tape cartridge into a tape drive, and the time to locate the tape to a desired location.

The storage manager 130 maps a plurality of logical volumes 162 within cache 160 to a plurality of logical (virtual) devices. The hosts 102 perform I/O operations by accessing logical (virtual) volumes in the logical devices via the VTS 110. The storage manager 130 maps the logical volumes to the physical volumes 156A . . . 156N. Although the hosts 102 access data via logical volumes and logical devices, the data is physically stored in the physical volumes 156A . . . 156N mountable on the physical devices 154A . . . 154N.

The logical volumes 162A . . . 162N corresponding to the physical volumes 156A . . . 156N maybe resident in the cache 160. In FIG. 2, the cache 160 contains logical volumes 162A . . . 162N. The logical volumes resident on the cache 160 may change over time. The storage manager 130 attempts to keep the more likely to be used logical volumes in the cache 160.

When a host 102 writes a logical volume to the VTS 110, the data is stored as a file in the cache 160. The cached data is later premigrated onto a physical volume 156A . . . 156N. The original logical volume is left in the cache 160 for cache hits. When the cache 160 fills to a predetermined threshold, the logical volume data for a selected logical volume 162A . . . 162N is removed from the cache to free space for more logical volumes. In certain implementations, the storage manager 130 removes from the cache 160 a selected logical volume 162N . . . 162N that has been resident on the cache 160 for the longest period of time (i.e., the least recently used logical volume).

Figure 3:
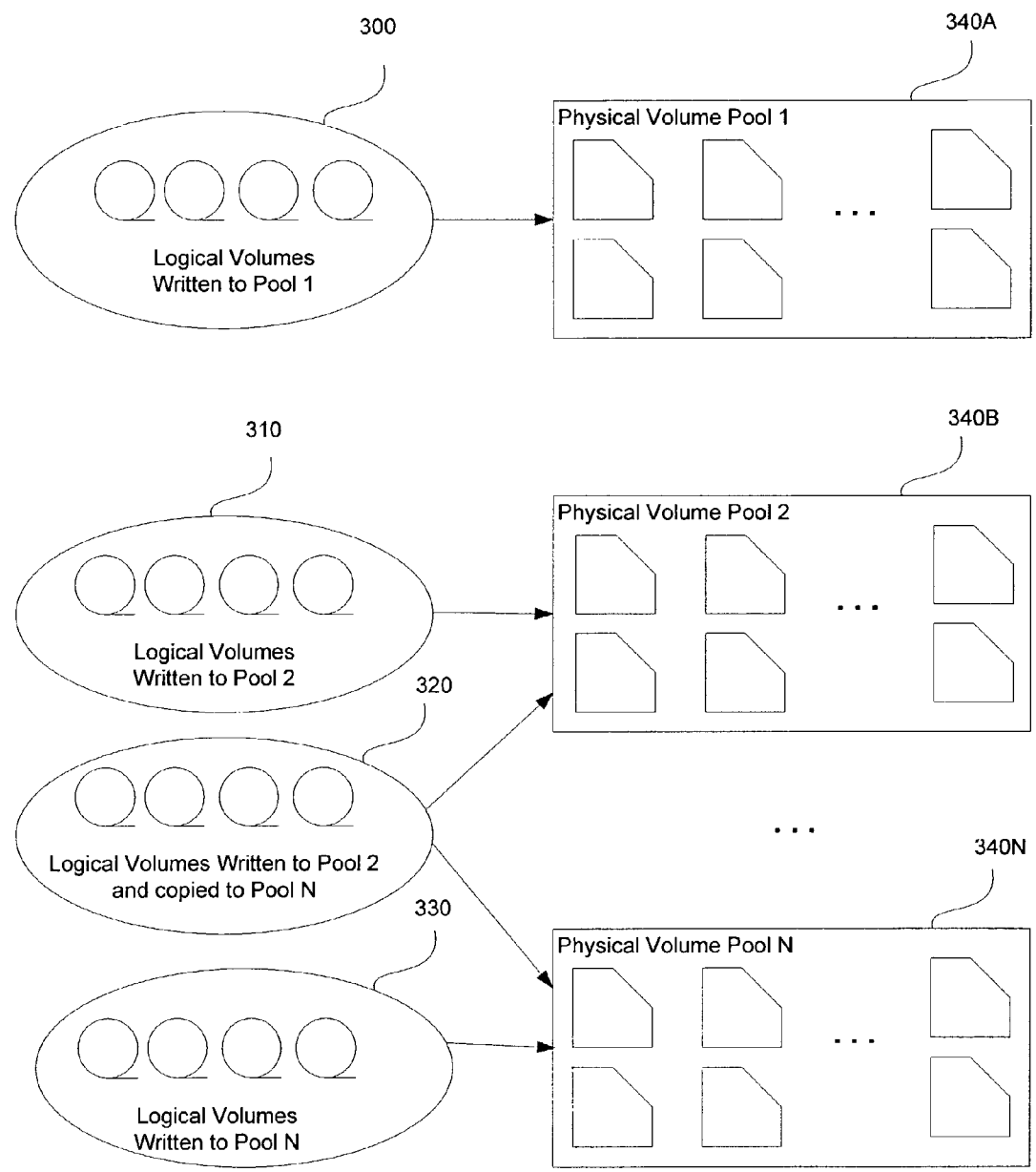
FIG. 3 illustrates, in a block diagram, logical volumes and pools of physical volumes in accordance with certain implementations of the invention.

FIG. 3 illustrates, in a block diagram, logical volumes and pools of physical volumes (i.e., physical volume pools) 340A . . . 34N in accordance with certain implementations of the invention. The physical volumes are grouped into physical volume pools 340A . . . 340N. Logical volumes 300, 310, 320, and 330 reside in cache 160.

In the case of a single physical volume pool, all logical volumes may be written to any of the physical volumes managed by the VTS 110, and only one copy of a logical volume is written into the physical volume pool.

On the other hand, the VTS 110 uses multiple physical volumes pools 340A . . . 340N. In certain implementations, the physical volumes are separated into one of 33 different physical volume pools, however, in other implementations, fewer or more physical volume pools 340A . . . 340N may be formed. One of these 33 physical volume pools 340A . . . 340N holds scratch physical volumes (e.g., tape cartridges) and represents a common scratch pool. The other 32 physical volume pools 340A . . . 340N contain a mixture of empty, full, and filling physical volumes (e.g., tape cartridges). Each physical volume 156 belongs to one of the physical volume pools 340A . . . 340N. An out of available space condition occurs when one of the 32 physical volume pools 340A . . . 340N has no available space on physical volumes 156 (e.g., no partially or completely empty physical volumes 156) on which to write data from cache 160.

Logical volumes 300, 310, 320, and 330 are assigned to one of the physical volume pools 340A . . . 340N by the hosts 102. The hosts 102 can also indicate that a logical volume (e.g., 320) ("original logical volume") is to have a copy ("backup volume") created. The copy of the original logical volume resides in a different physical volume pool 340N than the original logical volume, which is in physical volume pool 340B. Because physical volumes are separated by physical volume pools, and since original and backup copies of a logical volume 320 are not on the same physical volume, both cannot be destroyed through the destruction of a single physical volume or of a single physical volume pool 340A . . . 340N.

Multiple logical volumes 162 are associated with each physical volume pool 340A . . . 340N. Also, each physical volume pool 340A . . . 340N includes multiple physical volumes 156. Multiple logical volumes 162 associated with the same physical volume pool 340A . . . 340N may be on one or more physical volumes 156 for the associated physical volume pool 340A . . . 340N.

Multiple physical volume pools 340A . . . 340N allow customers that run service bureaus with multiple client customers to separate each of their client's data onto a separate physical volume pool 340A . . . 340N.

Figure 4:
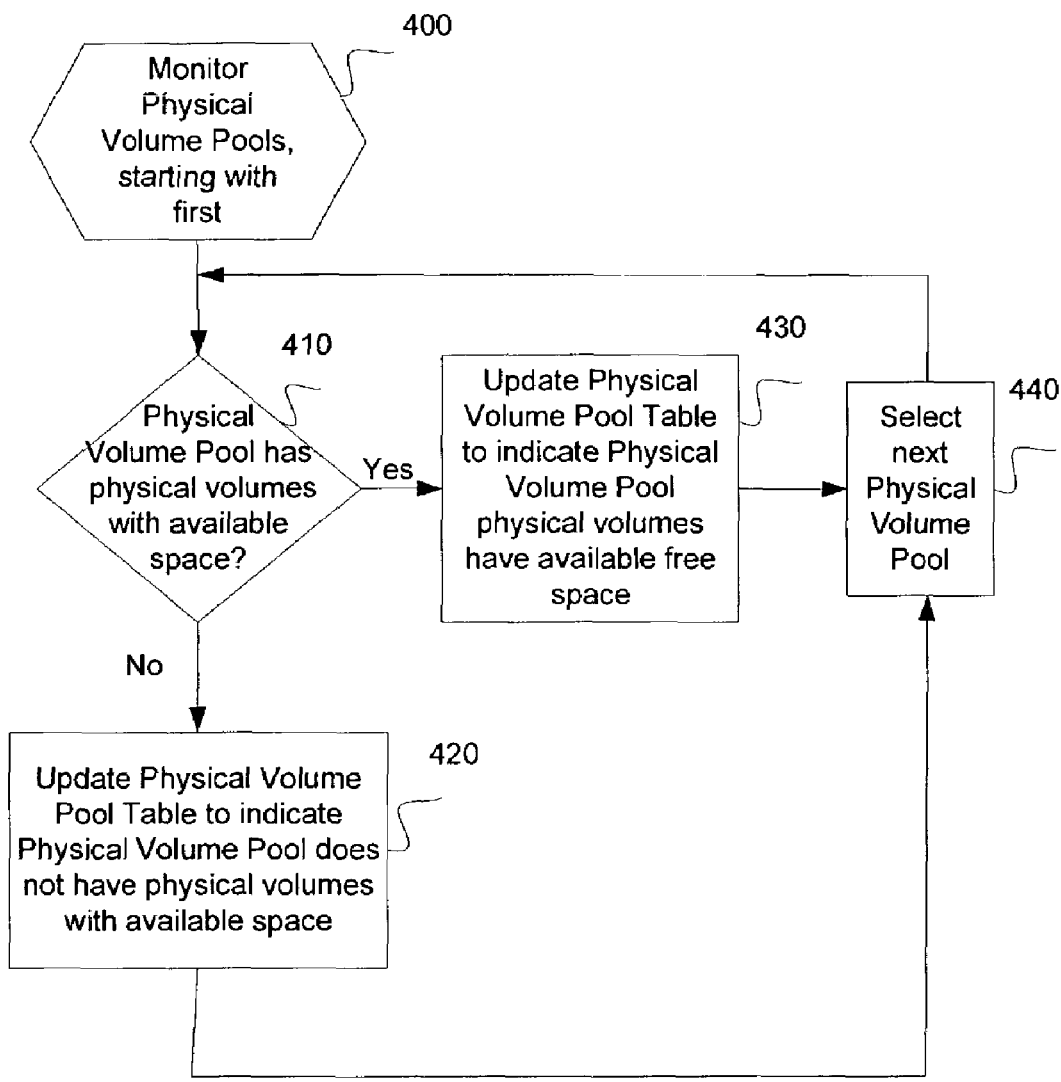
FIG. 4 illustrates logic implemented by the monitor to maintain a physical volume pool table in accordance with certain implementations of the invention.

FIG. 4 illustrates logic implemented by the monitor 170 to maintain a physical volume pool table in accordance with certain implementations of the invention. Control begins at block 400 with the monitor 170 reviewing the status of the physical volume pools 340A . . . 340N, starting with the first physical volume pool. The physical volume pools 340A . . . 340N may be monitored in any order that allows for the status of each of the physical volume pools 340A . . . 340N to be reviewed by the storage manager 130. In block 410, the monitor 170 determines whether the physical volume pool 340A . . . 340N being monitored has one or more physical volumes with available space. The out of available space condition may be defined differently for different implementations. For example, in certain implementations, a physical volume pool 340A . . . 340N is determined to be in an out of available space condition if an amount of available space on the physical volumes 156 in the physical volume pool 340A . . . 340N is at or below a threshold. If the physical volume pool 340A . . . 340N being monitored has physical volumes with available space, processing continues to block 430, otherwise, processing continues to block 420.

In block 420, the monitor 170 updates a physical volume pool table 500 (FIG. 5) to indicate that the physical volume pool 340A . . . 340N does not have physical volumes with available space (i.e., the physical volume pool is in an out of available space condition). In certain implementations, the monitor 170 and library manager 152 each maintain a copy of the physical volume pool table 500.

FIG. 5 illustrates, in a block diagram, a physical volume pool table 500 in accordance with certain implementations of the invention. The physical volume pool table 500 includes a column 510 for physical volume pool identifiers (e.g., numbers) and a column 520 of the status of the physical volume pools 340A . . . 340N. For example, physical volume pools 1 and N do not have physical volumes 162 with available space, while physical volume pools 2 and 3 have physical volumes 162 with available space.

In block 430, the monitor 170 ensures that the physical volume pool table 500 indicates that the physical volume pool 340A . . . 340N has physical volumes with available space. In block 440, the monitor 170 selects the next physical volume pool 340A . . . 340N.

Figure 6:
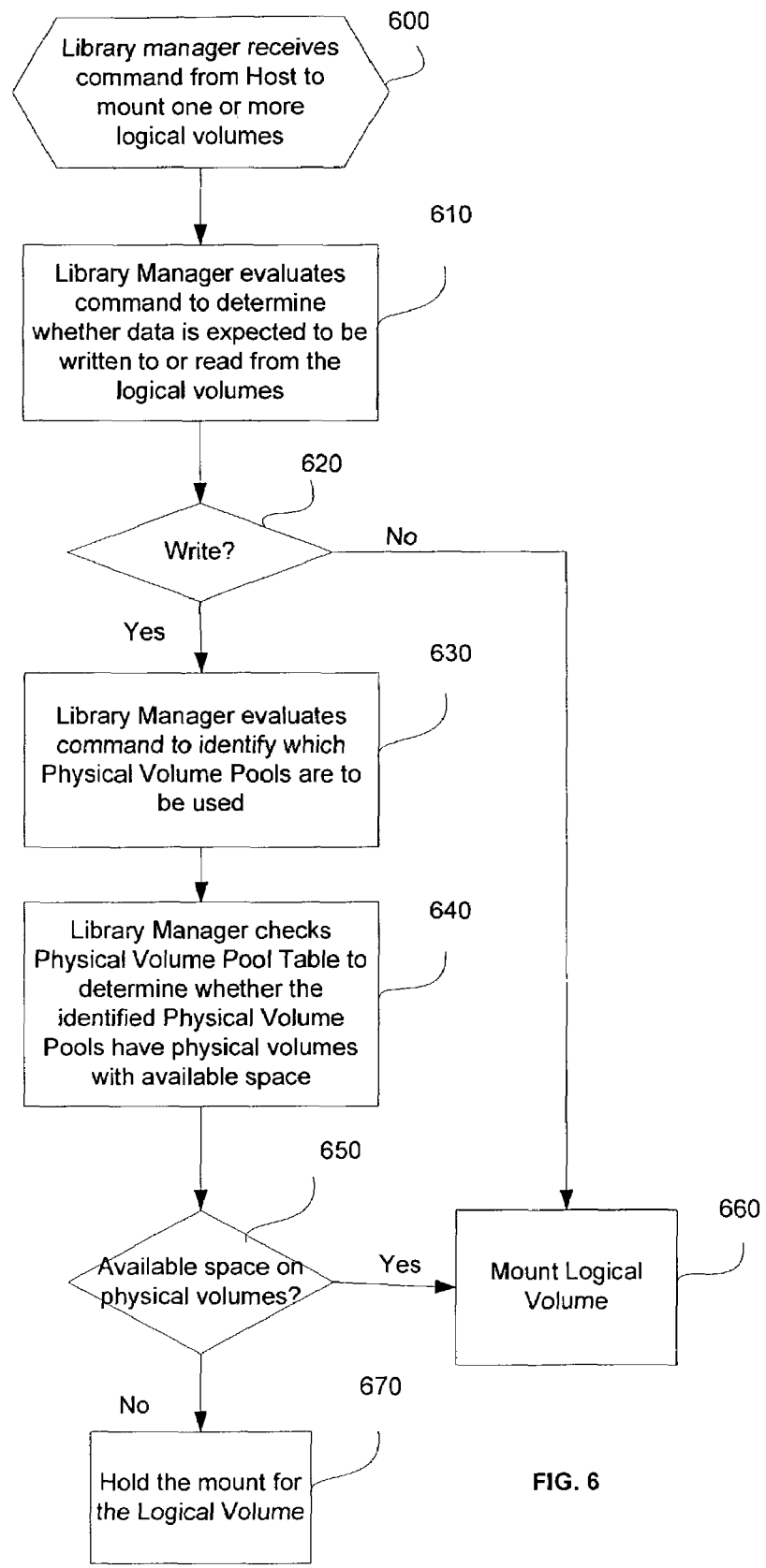
FIG. 6 illustrates logic implemented by the library manager for managing an out of available space condition in accordance with certain implementations of the invention.

FIG. 6 illustrates logic implemented by the library manager 152 for managing an out of available space condition in accordance with certain implementations of the invention. Control begins in block 600 with library manager 152 receiving from the host 102 a mount command to mount one or more logical volumes. In the mount command, the host 102 specifies a primary physical volume pool into which one or more original logical volumes are to be written and a secondary physical volume pool into which one or more backup logical volumes are to be written.

In certain implementations, the host 102 issues a Perform Library Function—Library Universal Mount (PLF-LUM) command. The host 102 specifies one of the parameters of the PLF-LUM to be a "mount from category" value to indicate that the library manager 152 is to mount a logical volume 162 that is currently assigned to that category, indicating that data may be written to the logical volume 162. The host 102 also specifies a Storage Group construct (i.e., which identifies a primary physical volume pool) and, if a backup copy is to be made, a Management Class construct (i.e., which identifies a secondary physical volume pool).

In block 610, the library manager 152 evaluates the mount command to determine whether data is expected to be written to or read from the one or more original logical volumes. In block 620, if it is determined that data is expected to be written to the one or more original logical volumes, processing continues to block 630, otherwise, processing continues to block 660. That is, if data is expected to be read, the mount is not held. Thus, in block 660, the logical volume 162 is mounted.

In block 630, the library manager 152 evaluates the command from the host 102 to determine which physical volume pools 340A . . . 340N will be used to store a logical volume's original copy and backup copy, if a backup copy is requested by the host 102. If the PLF-LUM command is used, the library manager 153 evaluates the Storage Group and Management Class constructs to determine which physical volume pools 340A . . . 340N are to be used.

In block 640, the library manager 152 checks the physical volume pool table 500 to determine whether the identified physical volume pools have physical volumes with available space. That is, the library manager 152 checks the physical volume pool table 500 to determine whether the monitor 170 has reported that the original and, if requested, the backup physical volume pool have physical volumes with available space.

In block 650, if the library manager 152 determines that one or both of the original and backup physical volume pools has no available space on their physical volumes, processing continues to block 670, otherwise, processing continues to block 660. In block 670, the library manager 152 holds the mount for a logical volume 162. Holding the mount for a logical volume 162 refers to deferring the completion of the logical volume mount such that no host 102 data transfer is possible on that logical volume 162. In certain implementations, the library manager 152 sends a message to the host 102 to indicate when a mount has completed, but does not send a message to the host 102 indicating that the logical volume 162 has not been mounted. When a mount is completed, a logical volume 162 may be written to cache 160 by a host 102. While a mount command is being held due to an out of available space condition, the library manager 152 supports a set of host 102 and operator (via operator interface 104) queries about the status of the mount command and also allows the mount command to be cancelled.

Figure 7:
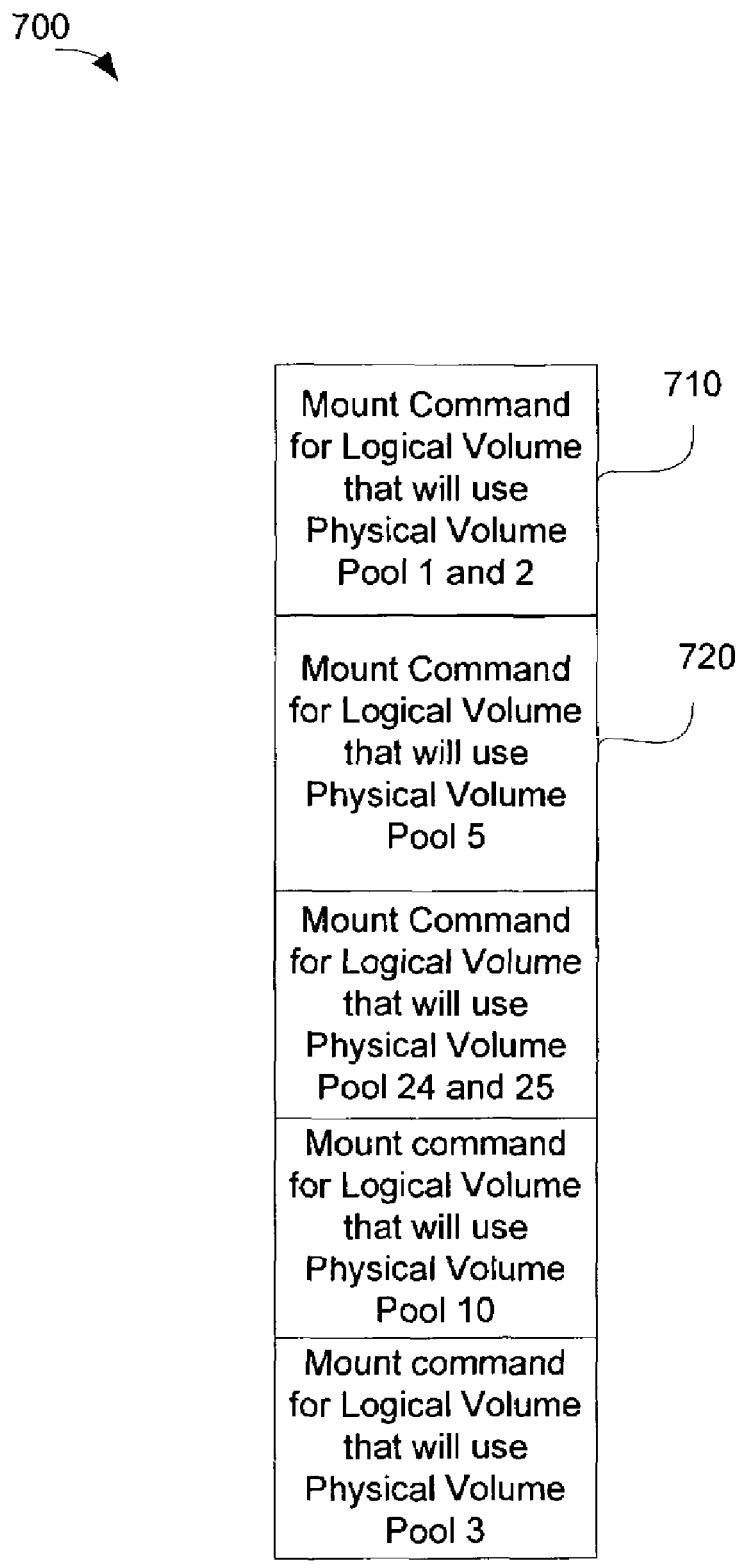
FIG. 7 illustrates, in a block diagram, a sample queue in accordance with certain implementations of the invention.

In certain implementations, the library manager 162 maintains a queue 700 (FIG. 7) of mount commands that are being delayed. FIG. 7 illustrates, in a block diagram, a sample queue 700 in accordance with certain implementations of the invention. The queue 700 lists mount commands that specify logical volumes 162 and the physical volume pools that the logical volumes will be using. In particular, the logical volume 162 for mount command 710 requires both an original and a backup physical volume pool, while the logical volume 162 for mount command 720 requires only an original physical volume pool. In certain implementations, the mount command may specify only a backup physical volume pool. When a queue 700 is maintained, if either or both original and backup physical volume pools are in out of available space conditions, the library manager 152 holds the mount command in the queue 700, preventing the mounting of logical volumes 162 from completing. If the mounting cannot complete, the host 102 recognizes that it may not write additional data to cache 160.

All other physical volume pools operate normally (i.e., when a request to mount a logical volume 162 for a physical volume pool that is not in an out of available space condition is received by the library manager 152, the logical volume 162 is mounted in physical device 154). Thus, in block 650, the library manager 152 mounts the physical volume 156.

In certain implementations, if the mount for the logical volume 162 is not a "mount from category," then the mount is allowed to complete, as this type of mount usually means a read operation will occur.

Figure 8A:
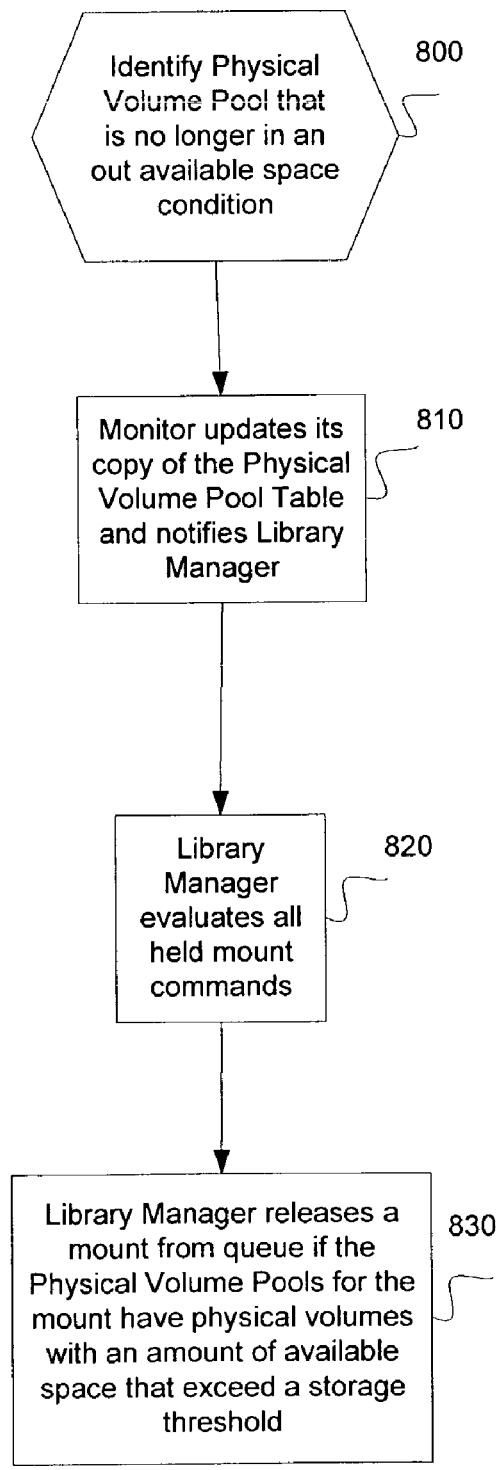
FIGS. 8A and 8B illustrates logic performed by monitor and library manager in accordance with certain implementations of the invention.
Figure 8B:
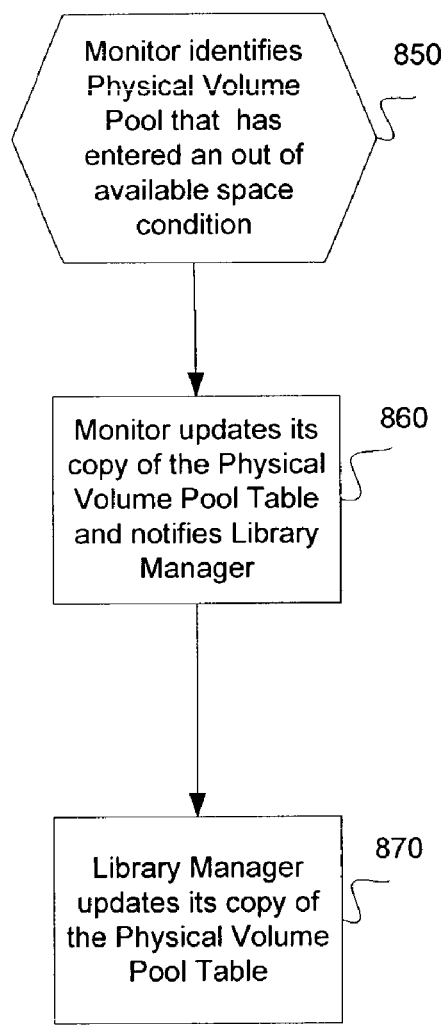

FIGS. 8A and 8B illustrate logic performed by monitor 170 and library manager 152 in accordance with certain implementations of the invention. In FIG. 8A, control begins at block 800, with the monitor 170 identifying a physical volumes pool that is no longer in an out of available space condition. In certain implementations, a physical volume pool is no longer in an out of available space condition when an amount of available space on the physical volumes 156 exceeds a threshold. For example, the threshold may be set to require that at least three partially or completely empty physical volumes 156 be available.

The monitor 170 constantly monitors the physical volume pools and both updates its copy of the physical volume pool table 500 and notifies the library manager 152 of physical volume pools whose status moves from an out of available space condition to having available space on physical volumes (block 810). In block 820, the library manager 152 evaluates all held mount commands. For example, the library manager 152 reviews the mount commands in queue 700 and determines whether all physical volume pools specified in each mount command now have physical volumes with available space. In block 830, the library manager 152 releases a mount command from queue 700 if the specified original physical volume pool and, if requested, the backup physical volume pool have physical volumes with an amount of available space that exceed a threshold (e.g., at least three physical volumes are partially or completely empty for each physical volume pool).

In FIG. 8B, control begins at block 850, with the monitor 170 identifying a physical volume pool that has entered an out of available space condition. In certain implementations, a physical volume pool enters an out of available space condition when an amount of available space on the physical volumes 156 is at or below a threshold. For example, the threshold may be set to require that at least three partially or completely empty physical volumes 156 be available. The monitor 170 constantly monitors the physical volume pools and both updates its copy of the physical volume pool table 500 and notifies the library manager 152 of physical volume pools whose status moves from to having available space on physical volumes to an out of available space condition (block 860). In block 870, the library manager 152 updates its copy of the physical volume pool table.

Thus, logical volumes 162 associated with physical volume pools 340A . . . 340N that do not have physical volumes 156 with available space for storing data may not be written to cache 160. In particular, in certain implementations, the physical volume pool 340A . . . 340N that is intended to be used during physical volume mount processing is identified. Then, a check is made to determine whether the physical volume pool 340A . . . 340N is in an out of physical volumes 156 condition. The mounting of logical volumes 162 is held (e.g., queued) until physical volumes 156 have available space. This prevents physical volume pools 340A . . . 340N that do not have physical volumes with available space from writing data to cache 160 while allowing other physical volume pools 340A . . . 340N to continue to write data to cache 160. Operations for physical volume pools 340A . . . 340N that have available physical volumes 156 with available space are not affected. Therefore, implementations of the invention prevent data transfer by deferring the mounting of one or more logical volumes 162.

ADDITIONAL IMPLEMENTATION DETAILS

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described implementations, certain variables, such as N are used to denote integer values indicating a certain number of elements. These variables may denote any number when used at different instances with the same or different elements. For example, in FIG. 3, for logical volumes 162A . . . N, N may represent Q number of elements; while for physical devices 154A . . . N, N may represent M number of elements; and, for physical volumes 156A . . . N, N may represent P number of elements.

The logic of FIGS. 4, 6, and 8A-8B describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIGS. 4, 6, and 8A-8B was described as being implemented in software. This logic may be part of the operating system of the host systems or an application program. In yet further implementations, this logic may be maintained in storage areas managed by the control units or in a read only memory or other hardwired type of device. The preferred logic may be implemented in hard disk drives or in programmable and non-programmable gate array logic.

In alternative implementations, rather than queuing mount commands, the VTS 110 may queue write commands to logical volumes associated with physical volume pools that are out of physical volumes with available space. In yet further implementations, the VTS 110 may allow a mount command to complete and fail one or more subsequent write commands to logical volumes associated with physical volume pools that are out of physical volumes with available space.

Figure 9:
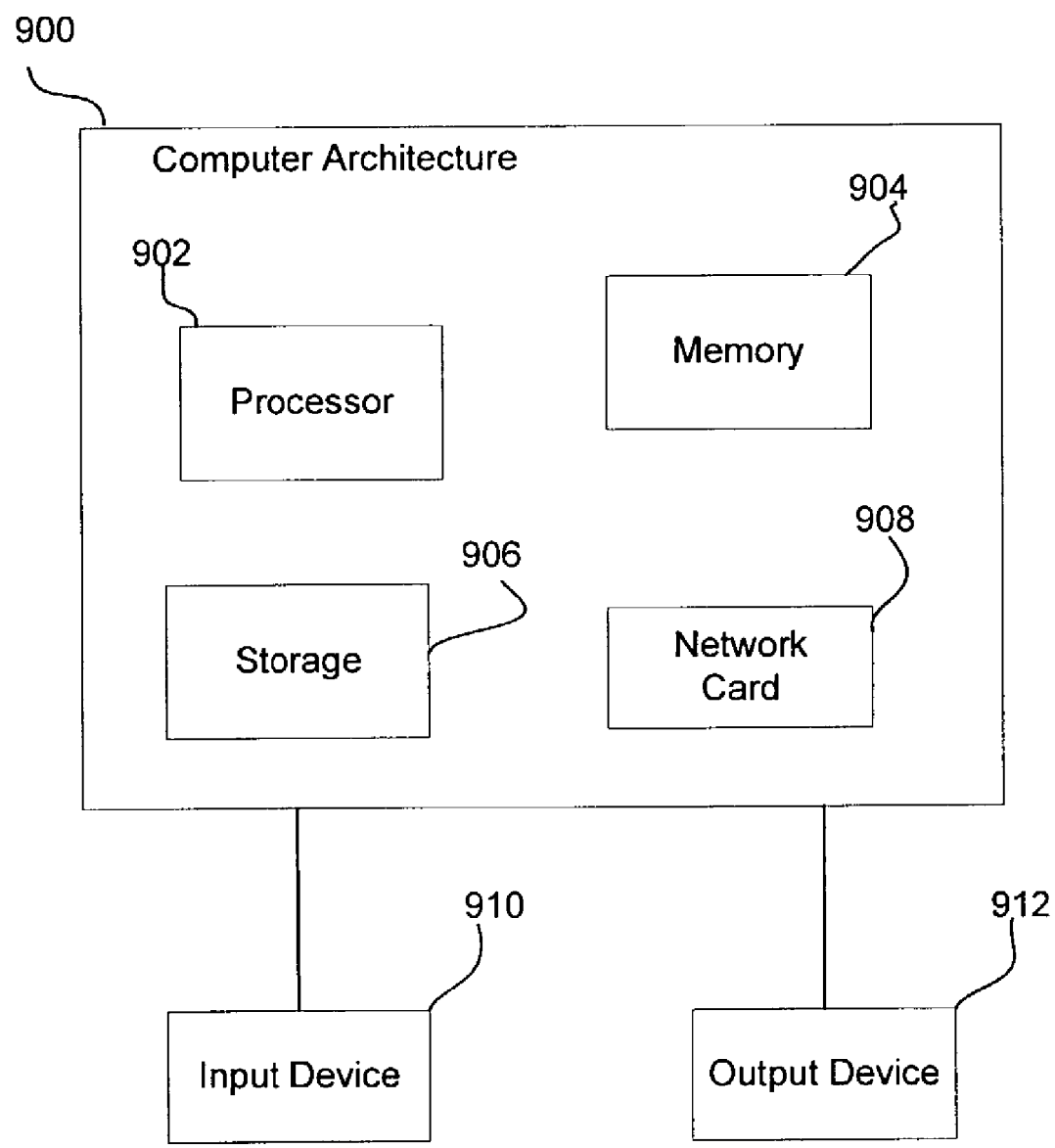
FIG. 9 illustrates one implementation of the architecture of hosts, operator interfaces, and a virtual tape server.

FIG. 9 illustrates one implementation of the architecture of hosts 102, operator interfaces 104, and VTS 110. The hosts 102, operator interfaces 104, and VTS 110 may implement a computer architecture 900 having a processor 902 (e.g., a microprocessor), a memory 904 (e.g., a volatile memory device), and storage 906 (e.g., a non-volatile storage, such as magnetic disk drives, optical disk drives, a tape drive, etc.). The storage 906 may comprise an internal storage device or an attached or network accessible storage. Programs in the storage 906 are loaded into the memory 904 and executed by the processor 902 in a manner known in the art. The architecture further includes a network card 908 to enable communication with a network. An input device 910 is used to provide user input to the processor 902, and may include a keyboard, mouse, pen-stylus, microphone, touch sensitive display screen, or any other activation or input mechanism known in the art. An output device 912 is capable of rendering information transmitted from the processor 902, or other component, such as a display monitor, printer, storage, etc.

While the hosts 102 and the VTS 110 communicate within a client-server paradigm in the described implementations, the hosts 102 and the VTS 110 may also communicate within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for managing an out of available space condition, comprising:
receiving a mount command for a logical volume that identifies one or more physical volume pools to be subsequently used for pre-migration, wherein the logical volume is assigned to the one or more physical volume pools, wherein each of the one or more physical volume pools includes one or more physical volumes, and wherein each of the physical volumes is a storage device that is capable of being mounted onto a physical device;
determining that one or more of the physical volume pools have no physical volumes available for storing data by determining that an amount of available space on the physical volumes is at or below a threshold; and
preventing data from being written to a cache by deferring completion of the mount command until the determined one or more physical volume pools has one or more physical volumes available for storing data, wherein deferring completion of the mount command for the logical volume prevents host data transfer to the logical volume in the cache.

2. The method of claim 1, further comprising:
determining that data is expected to be written to the logical volume after receiving the mount command.

3. The method of claim 1, further comprising:
determining that data is expected to be read from the logical volume after receiving the mount command; and
allowing the mount command to complete.

4. The method of claim 1, further comprising:
monitoring a status of each of the physical volume pools; and
updating a physical volume pool table with the status.

5. The method of claim 4, wherein the determination that the one or more physical volume pools have no physical volumes available for storing data is performed by accessing the physical volume pool table.

6. The method of claim 1, further comprising:
when an amount of available space on the physical volumes exceeds the threshold for each of the physical volume pools specified in the mount command, processing the mount command.

7. The method of claim 6, further comprising:
evaluating one or more mount commands to determine which of the mount commands may be processed.

8. The method of claim 1, further comprising:
when an amount of available space on the physical volumes exceeds the threshold for each of the physical volume pools specified in the mount command, allowing the data to be written to the cache.

9. The method of claim 1, wherein deferring completion of the mount command further comprises:
storing the mount command in a queue.

10. The method of claim 1, wherein preventing the data from being written to the cache comprises preventing the logical volume from being mounted.

11. The method of claim 1, wherein preventing the data from being written to the cache, further comprises:
instead of deferring completion of the mount command, allowing the mount command to complete; and
failing one or more subsequently received write commands to the logical volume.

12. The method of claim 1, wherein preventing the data from being written to the cache, further comprises:
instead of deferring completion of the mount command, allowing the mount command to complete; and
holding one or more subsequently received write commands to the logical volume in a queue.

13. The method of claim 1, wherein the mount command is transmitted from a host to a library manager through a virtual tape server for processing.

14. The method of claim 13, wherein the library manager notifies the host through the virtual tape server that the mount command has been completed.

15. The method of claim 1, wherein one of the physical volumes is available when that physical volume has space for storing data.

16. The method of claim 1, wherein one or more logical volumes are associated with each of the physical volume pools and wherein the one or more logical volumes are stored in the cache.

17. A system for managing an out of available space condition, comprising:
a logical volume;
one or more physical volumes;
means for receiving a mount command for the logical volume that identifies one or more physical volume pools to be subsequently used for pre-migration, wherein the logical volume is assigned to the one or more physical volume pools, wherein each of the one or more physical volume pools includes one or more of the one or more physical volumes, and wherein each of the physical volumes is a storage device that is capable of being mounted onto a physical device;
means for determining that one or more of the physical volume pools have no physical volumes available for storing data by determining that an amount of available space on the physical volumes is at or below a threshold; and
means for preventing data from being written to a cache by deferring completion of the mount command until the determined one or more physical volume pools has one or more physical volumes available for storing data, wherein deferring completion of the mount command for the logical volume prevents host data transfer to the logical volume in the cache.

18. The system of claim 17, further comprising:
means for determining that data is expected to be written to the logical volume after receiving the mount command.

19. The system of claim 17, further comprising:
means for determining that data is expected to be read from the logical volume after receiving the mount command; and
means for allowing the mount command to complete.

20. The system of claim 17, further comprising:
means for monitoring a status of each of the physical volume pools; and
means for updating a physical volume pool table with the status.

21. The system of claim 20, wherein the determination that the one or more physical volume pools have no physical volumes available for storing data is performed by accessing the physical volume pool table.

22. The system of claim 17, further comprising:
means for, when an amount of available space on the physical volumes exceeds the threshold for each of the physical volume pools specified in the mount command, processing the mount command.

23. The system of claim 22, further comprising:
means for evaluating one or more mount commands to determine which of the mount commands may be processed.

24. The system of claim 17, further comprising:
means for, when an amount of available space on the physical volumes exceeds the threshold for each of the physical volume pools specified in the mount command, allowing the data to be written to the cache.

25. The system of claim 17, wherein deferring completion of the mount command further comprises:
means for storing the mount command in a queue.

26. The system of claim 17, wherein the means for preventing the data from being written to the cache further comprises:
means for preventing the logical volume from being mounted.

27. The system of claim 17, wherein means for preventing the data from being written to the cache, further comprise:
means for, instead of deferring completion of the mount command, allowing the mount command to complete; and
means for failing one or more subsequently received write commands to the logical volume.

28. The method of claim 17, wherein means for preventing the data from being written to the cache, further comprise:
means for, instead of deferring completion of the mount command, allowing the mount command to complete; and
means for holding one or more subsequently received write commands to the logical volume in a queue.

29. The system of claim 17, further comprising:
a host;
a library manager;
a virtual tape server; and
means for transmitting the mount command from the host to the library manager through the virtual tape server for processing.

30. The system of claim 29, wherein the library manager comprises means for notifying the host through the virtual tape server that the mount command has been completed.

31. The system of claim 17, wherein one of the physical volumes is available when that physical volume has space for storing data.

32. The system of claim 17, wherein one or more logical volumes are associated with each of the physical volume pools, wherein the one or more logical volumes are stored in the cache.

33. An article of manufacture embodied as hardware based article of manufacture or computer readable storage medium tangibly embodying code or logic for managing an out of available space condition, wherein the article of manufacture is capable of causing operations to be performed upon execution of the code or logic, the operations comprising:

receiving a mount command for a logical volume that identifies one or more physical volume pools to be subsequently used for pre-migration, wherein the logical volume is assigned to the one or more physical volume pools, wherein each of the one or more physical volume pools includes one or more physical volumes, and wherein each of the physical volumes is a storage device that is capable of being mounted onto a physical device;

determining that one or more of the physical volume pools have no physical volumes available for storing data by determining that an amount of available space on the physical volumes is at or below a threshold; and preventing data from being written to a cache by deferring completion of the mount command until the determined one or more physical volume pools has one or more physical volumes available for storing data, wherein deferring completion of the mount command for the logical volume prevents host data transfer to the logical volume in the cache.

34. The article of manufacture of claim 33, the operations further comprising:

determining that data is expected to be written to the logical volume after receiving the mount command.

35. The article of manufacture of claim 33, the operations further comprising:

determining that data is expected to be read from the logical volume after receiving the mount command; and allowing the mount command to complete.

36. The article of manufacture of claim 33, the operations further comprising:

monitoring a status of each of the physical volume pools; and updating a physical volume pool table with the status.

37. The article of manufacture of claim 36, wherein the determination that the one or more physical volume pools have no physical volumes available for storing data is performed by accessing the physical volume pool table.

38. The article of manufacture of claim 33, the operations further comprising:

when an amount of available space on the physical volumes exceeds the threshold for each of the physical volume pools specified in the mount command, processing the mount command.

39. The article of manufacture of claim 38, the operations further comprising:

evaluating one or more mount commands to determine which of the mount commands may be processed.

40. The article of manufacture of claim 33, the operations further comprising:

when an amount of available space on the physical volumes exceeds a threshold for each of the physical volume pools specified in the mount command, allowing the data to be written to the cache.

41. The article of manufacture of claim 33, wherein deferring completion of the mount command further comprises:

storing the mount command in a queue.

42. The article of manufacture of claim 33, wherein preventing the data from being written to the cache comprises preventing the logical volume from being mounted.

43. The article of manufacture of claim 33, wherein the operations for preventing the data from being written to the cache further comprise:

instead of deferring completion of the mount command, allowing the mount command to complete; and failing one or more subsequently received write commands to the logical volume.

44. The article of manufacture of claim 33, wherein the operations for preventing the data from being written to the cache, further comprise:

instead of deferring completion of the mount command, allowing the mount command to complete; and holding one or more subsequently received write commands to the logical volume in a queue.

45. The article of manufacture of claim 33, wherein the mount command is transmitted from a host to a library manager through a virtual tape server for processing.

46. The article of manufacture of claim 45, wherein the library manager notifies the host through the virtual tape server that the mount command has been completed.

47. The article of manufacture of claim 33, wherein one of the physical volumes is available when that physical volume has space for storing data.

48. The article of manufacture of claim 33, wherein one or more logical volumes are associated with each of the physical volume pools, wherein the one or more logical volumes are stored in the cache.

* * * * *